US008869714B1

(12) United States Patent
Barry

(10) Patent No.: US 8,869,714 B1
(45) Date of Patent: Oct. 28, 2014

(54) MOBILE WORK BENCH

(71) Applicant: Steve B. Barry, Federal Way, WA (US)

(72) Inventor: Steve B. Barry, Federal Way, WA (US)

( * ) Notice: Subject to any disclaimer, the term of this patent is extended or adjusted under 35 U.S.C. 154(b) by 0 days.

(21) Appl. No.: 14/213,717

(22) Filed: Mar. 14, 2014

(51) Int. Cl.
*A47B 9/00* (2006.01)
*B62B 3/02* (2006.01)

(52) U.S. Cl.
CPC ........................................ *B62B 3/02* (2013.01)
USPC ...................... 108/103; 280/79.11; 144/286.1

(58) Field of Classification Search
USPC ........................... 144/285, 286.1, 287, 286.5; 83/471–474, 477.1, 477.2; 269/17, 269/289 R; 248/637, 676, 678–679, 248/670–674; 108/1.3; 180/291
See application file for complete search history.

(56) References Cited

U.S. PATENT DOCUMENTS

| | | | | | |
|---|---|---|---|---|---|
| 4,265,283 | A * | 5/1981 | Nash | .......................... | 144/286.5 |
| 4,465,114 | A * | 8/1984 | Schumacher | .............. | 144/286.1 |
| 5,570,641 | A * | 11/1996 | Garuglieri | ........................ | 108/13 |
| 7,089,980 | B2 * | 8/2006 | Rulli | .......................... | 144/286.1 |
| 2005/0061399 | A1 * | 3/2005 | Rulli | .......................... | 144/286.5 |
| 2013/0285302 | A1 * | 10/2013 | Helm | .............................. | 269/17 |

* cited by examiner

*Primary Examiner* — John Walters
*Assistant Examiner* — James Triggs
(74) *Attorney, Agent, or Firm* — Crossley Patent Law; Micah C. Gunn

(57) ABSTRACT

A wheeled mobile work bench which has an adjustable tabletop surface. The tabletop surface removably engages an adjustable rectangular frame which, in turn, is attached atop a pair of upright frame members, each upright frame member being attached to a respective bottom frame component. An electrical box attached to one of the right and left upright frame members is operationally connectable connected to a power cord having a plug. While the mobile work bench is in use, the plug is operationally connectable to a source of standard electrical current to permit use of a power tool plugged into the electrical box.

6 Claims, 7 Drawing Sheets

MOBILE WORK BENCH

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of work benches are in use and are known in the prior art. However, what is needed is a work bench that is mobile that has an adjustable tabletop surface, and this combination of characteristics is one that has not yet been utilized or conceived as shown in the present invention.

FIELD OF THE INVENTION

The present invention relates to a work bench, and more particularly, to a mobile work bench that provides features and characteristics above and beyond existing work benches that are presently available today.

SUMMARY OF THE INVENTION

The general purpose of the present work bench, described subsequently in greater detail, is to provide a mobile work bench which has many novel features that results in a mobile work bench which is not anticipated, rendered obvious, suggested, or even implied by prior art, either alone or in combination thereof.

The present invention disclosed herein is a mobile work bench which has an adjustable tabletop surface. The tabletop surface is removably attached to an adjustable support frame, which in turn is mounted atop a pair of upright support members that are attached to a frame. The frame has a quartet of caster wheels that supports the frame on a ground surface, with the frame also including an attachable electrical box with a power cord and power cord hanger that together, for providing power to a power tool.

Thus has been broadly outlined the more important features of the present mobile work bench so that the detailed description thereof that follows may be better understood and in order that the present contribution to the art may be better appreciated.

DETAILED DESCRIPTION OF THE DRAWINGS

Figure 1:
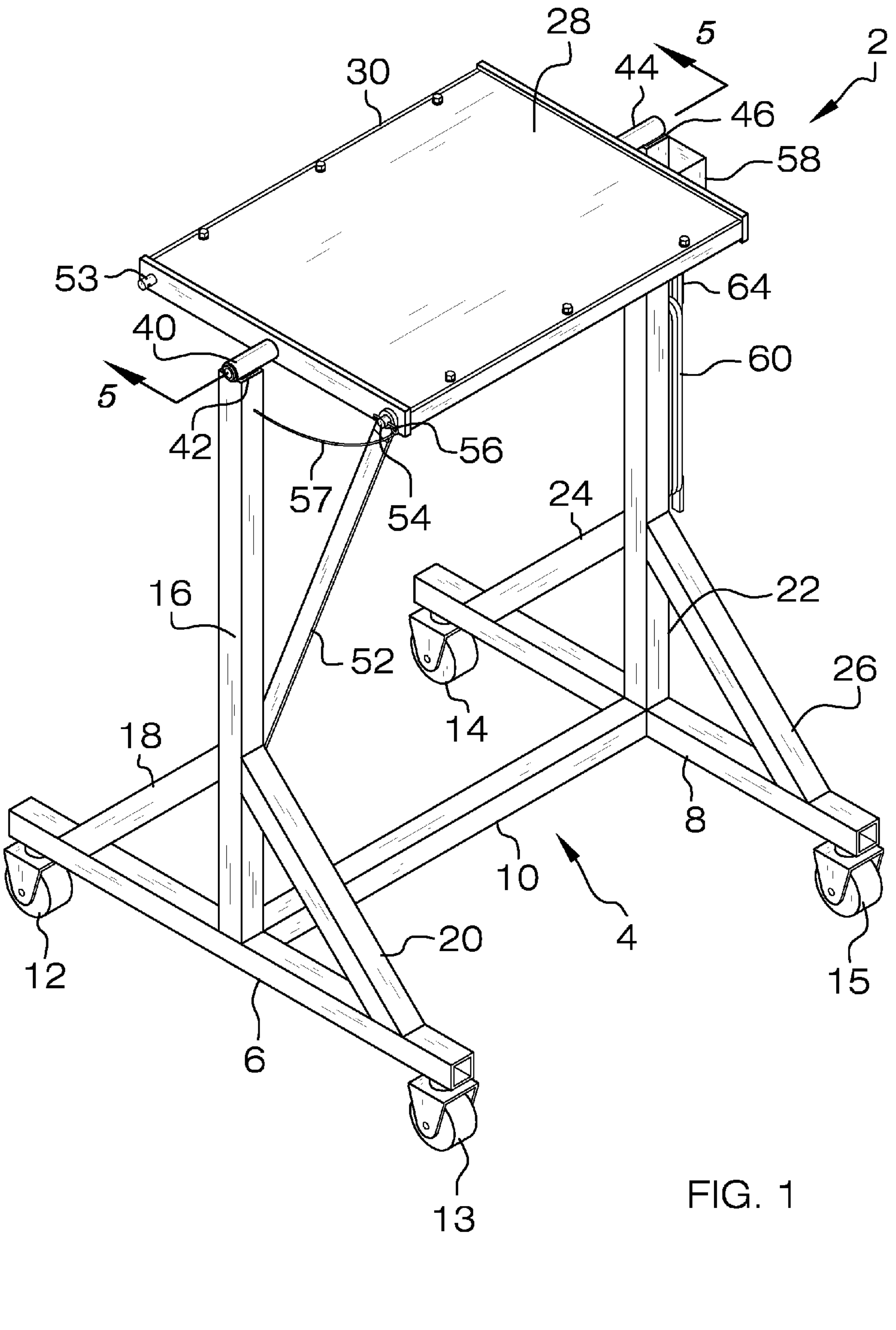
FIG. 1 is a left front perspective view of the mobile work bench as it would appear in use.
Figure 2:
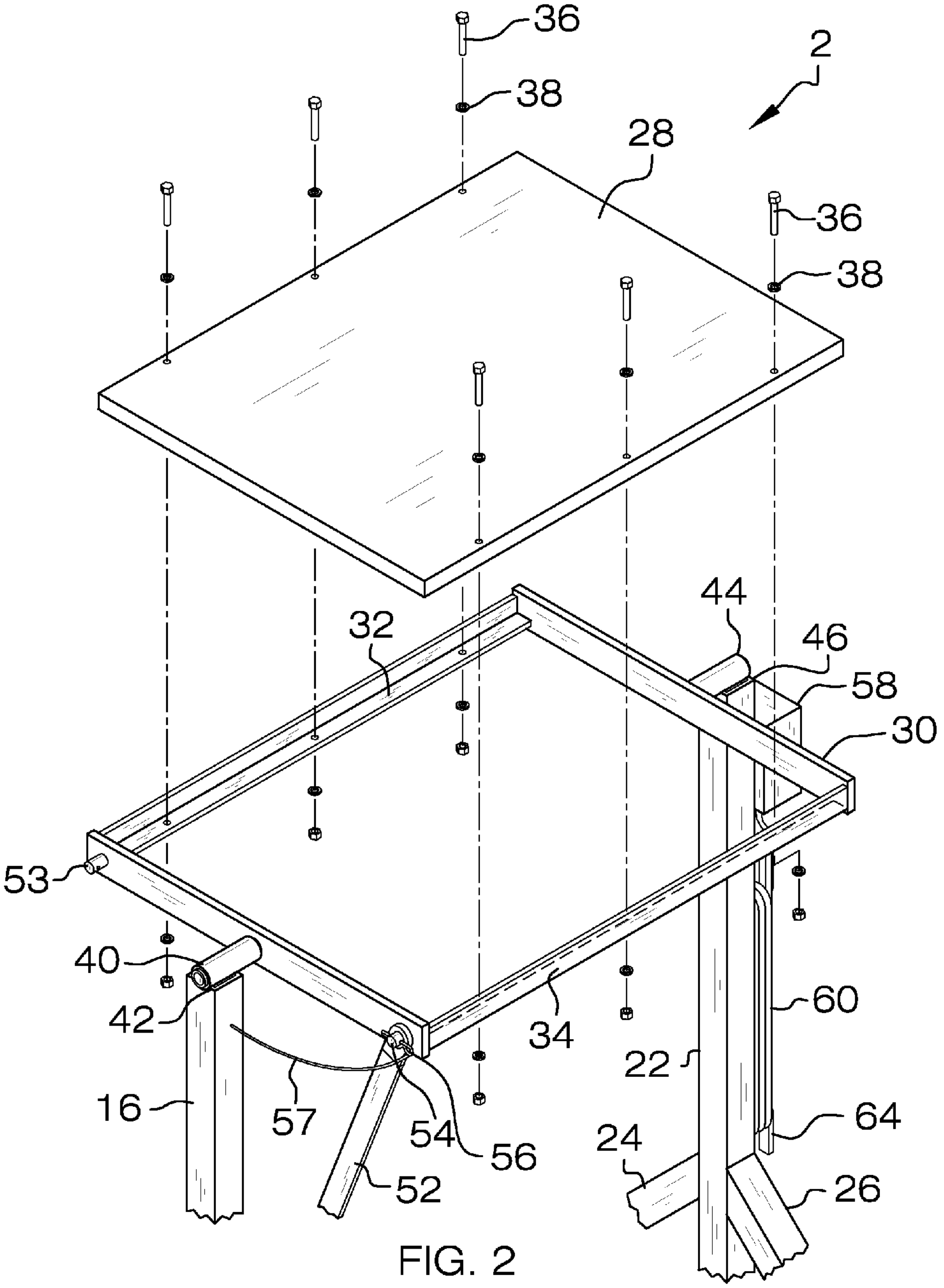
FIG. 2 is a partial exploded view of the various parts of the mobile work bench.
Figure 3:
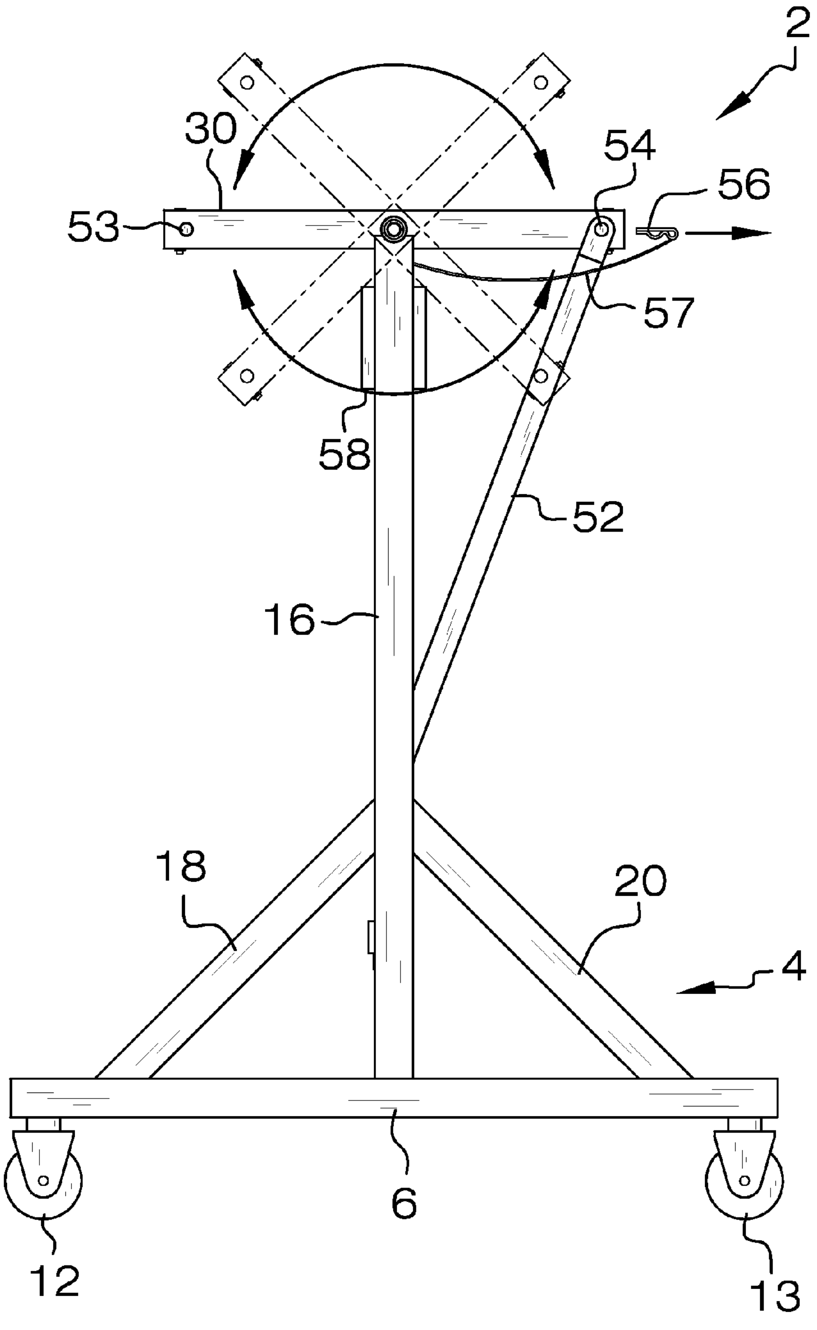
FIG. 3 is a left side view of the mobile work bench as it would appear in use.
Figure 4:
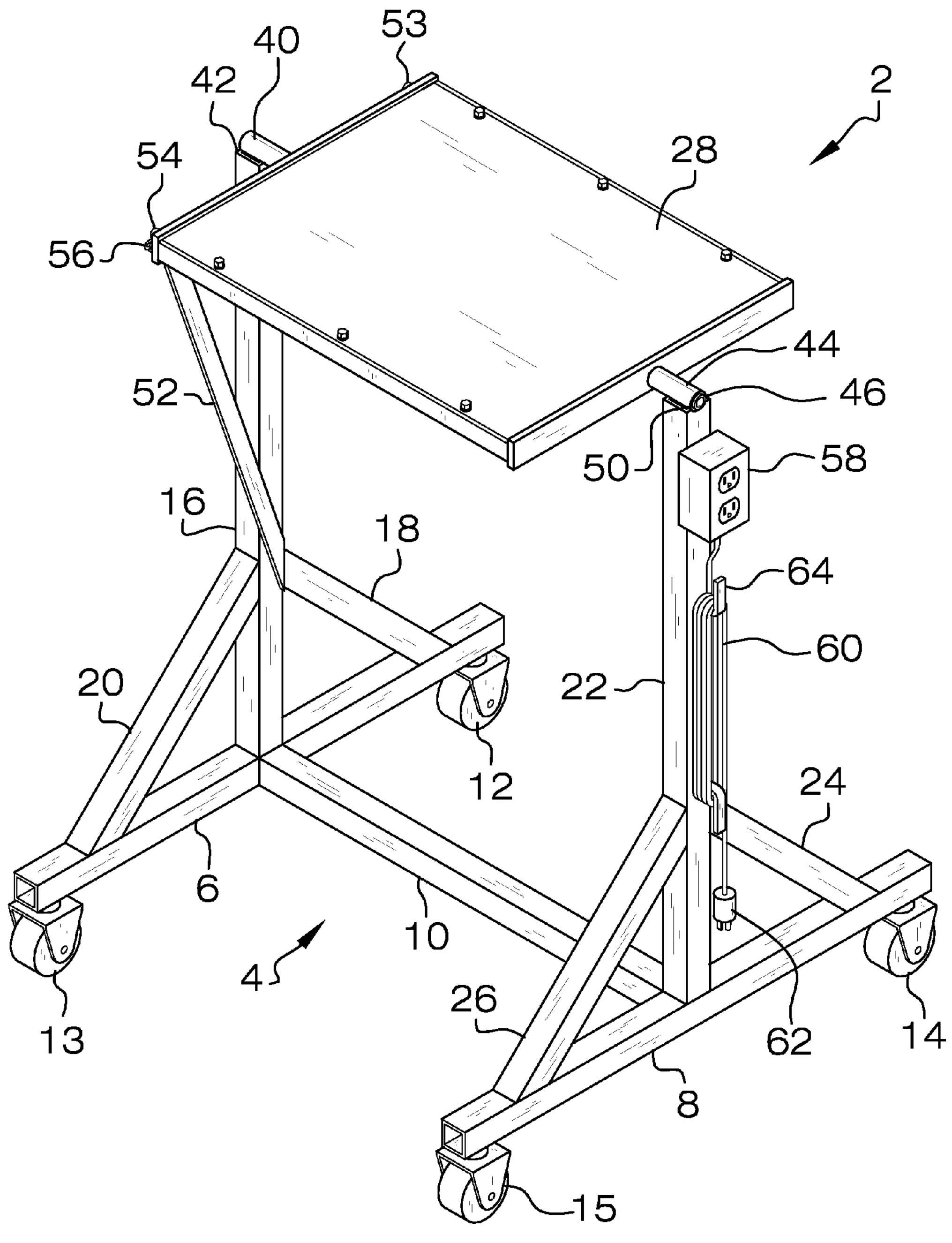
FIG. 4 is a right front perspective view of the mobile work bench as it would appear in use.
Figure 5:
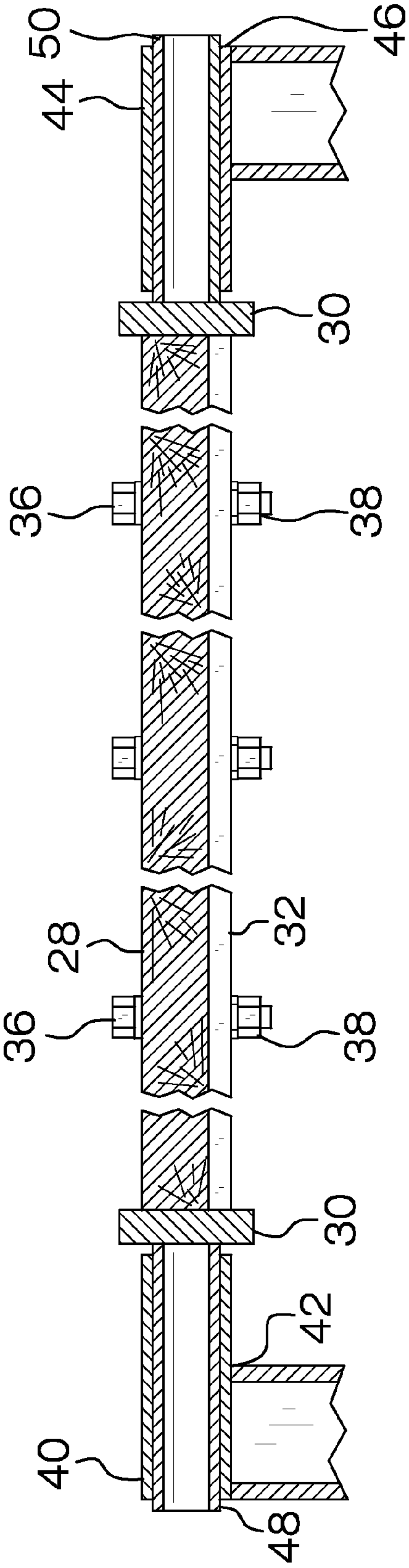
FIG. 5 is a cross-sectional view taken along line 5-5 of FIG. 1.
Figure 6:
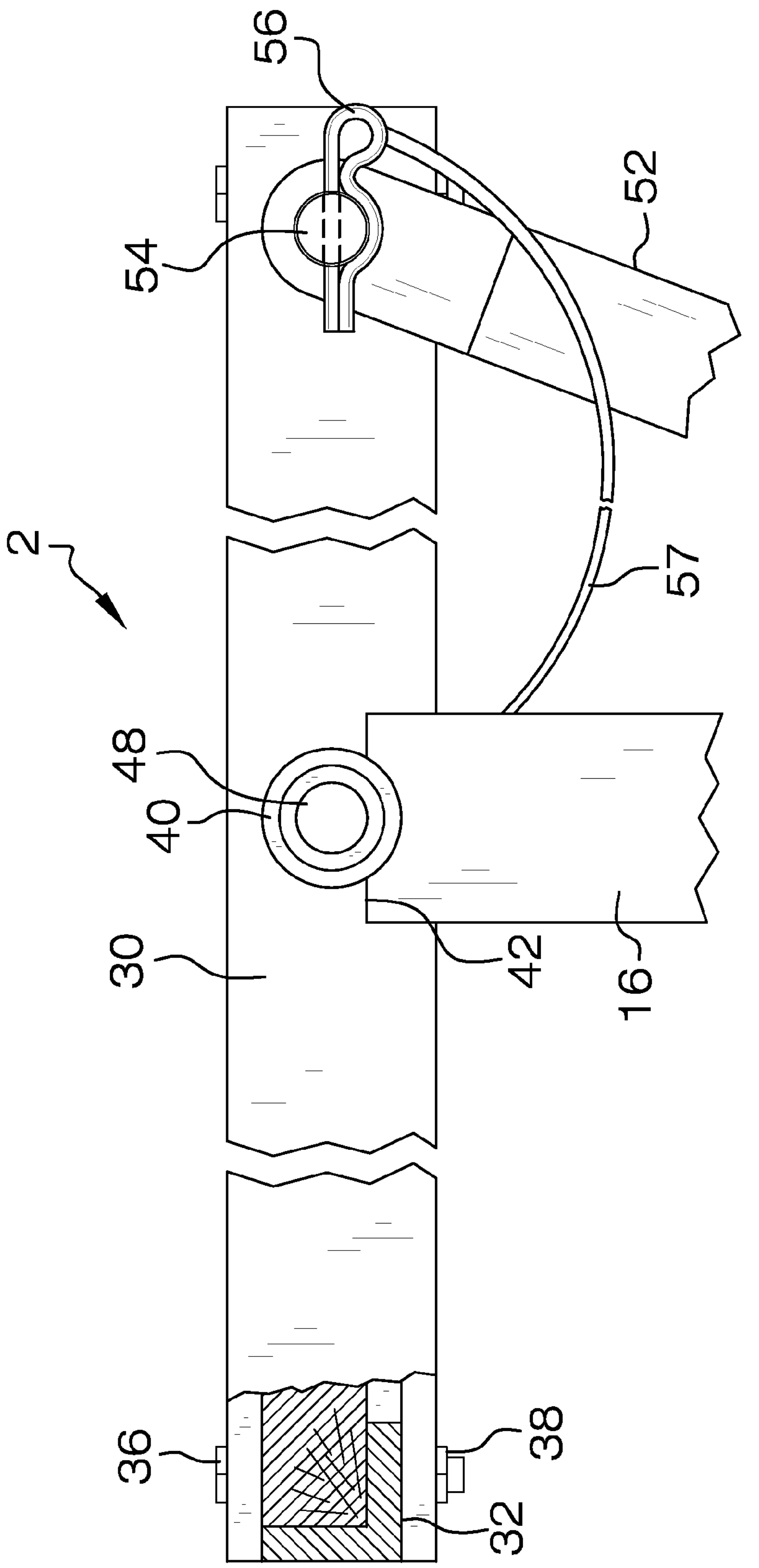
FIG. 6 is a left side view of the rectangular frame and support with a partial cutaway of the rectangular box.
Figure 7:
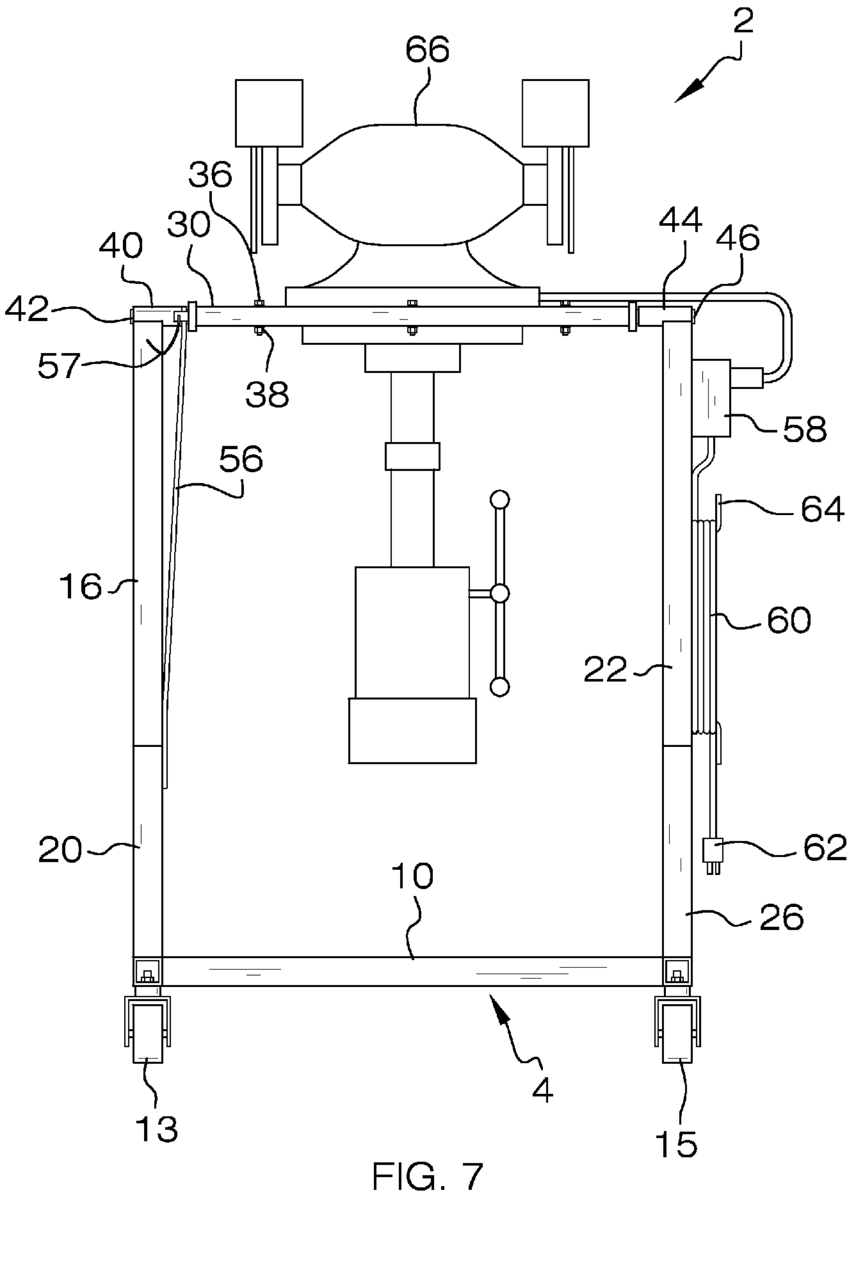
FIG. 7 is an in-use view.

With reference now to the drawings, and in particular FIGS. 1 through 7 thereof, an example of the mobile work bend with an incorporated light panel employing the principles and concepts of the present invention and generally designated by the reference number 2 will be described.

Referring to FIGS. 1 through 7, a preferred embodiment of the present invention is disclosed. The mobile work bench 2 disclosed herein has a framework 4 provided for support. Left bottom frame component 6 and right bottom frame component 8 are attached by cross member frame component 10. Left bottom frame component 6 is supported by a pair of caster wheels 12, 13, while right bottom frame component 8 is supported by a pair of caster wheels 14, 15.

Left upright frame member 16 extends vertically from left bottom frame component 6 and is supported by left frame support components 18 and 20, which are each attached to both the left upright frame member 16 and the left bottom frame component 6. Right upright frame member 22 extends vertically from right bottom frame component 8 and is supported by right frame support components 24, 26, which are each attached to both the right upright frame member 22 and the right bottom frame component 8.

A tabletop surface 28 is used with the mobile work bench 2, with the tabletop surface 28 releasably engaging a rectangular frame 30. The frame 30 has a pair of additional horizontal bar supports 32, 34. The tabletop surface 28 is placed within the frame 30 atop the supports 32, 34. Then, multiple fasteners 36 are inserted through both the tabletop surface 28 and the respective one of the horizontal bar supports 32, 34 and are removably affixed through the use of nuts 38.

Left sleeve 40 is fixedly attached to the top end 42 of left upright frame member 16, while right sleeve 44 is fixedly attached to the top end 46 of right upright frame member 22. Left rod 48 is fixedly attached to frame 30 and is insertable into left sleeve 40, while right rod 50 is fixedly attached to frame 30 and is insertable into right sleeve 44. Left rod 48 and right rod 50 are located opposite one another on the frame 30 and allow frame 30 and tabletop surface 28 to be rotatable.

A tabletop support bar 52 is attached to both the left upright frame member 16 and the rectangular frame 30. A first locking rod 53 and a second locking rod 54 are located on a portion of the frame that faces the left upright frame member 16 and only one of the two locking rods 53, 54 is used at a time. The tabletop support 52 sets the tabletop surface 28 and frame 30 into a fixed position after they have been rotated to the desired position by inserting a cotter pin 56 through the locking rod 54. The cotter pin 56 is attached by a chain 57 to the left upright frame member 16.

An electrical box 58 is attached to one of the right upright frame member 22 and the left upright frame member 16 and is connected to a power cord 60, which has a plug 62. The power cord 60 is configured to be hanged on a power cord hanger 64 that is also attached to the same one of the right upright frame member 22 and the left upright frame member 16 to which the electrical box 58 is attached. While the mobile work bench 2 is in use, the plug 62 is operationally connectable to a source of standard electrical current to permit use of a power tool 66 plugged into the electrical box 58. The electrical box 58 and the power cord hanger 64 could also be attached to the left upright frame member 16.

The invention claimed is:

1. A mobile work bench comprising:

a framework, the framework comprising:

a left bottom frame component;

a right bottom frame component;

a cross member frame component attached to each of the left bottom frame component and the right bottom frame component;

a plurality of caster wheels, a pair of caster wheels attached to each of the left bottom frame component and the right bottom frame component;

a left upright frame member having a top end, wherein the left upright frame member extends vertically from the left bottom frame component;

a pair of left frame support components comprising a first left frame support component and a second left frame support component, wherein each left frame support component is attached to both the left upright frame member and the left bottom frame component;

a right upright frame member, the right upright frame member having a top end, wherein the right upright frame member extends vertically from the right bottom frame component;

a pair of right frame support components comprising a first right frame support component and a second right frame support component, wherein each right frame support component is attached to both the right upright frame member and the right bottom frame component;

a pair of sleeves comprising a left sleeve and a right sleeve, wherein the left sleeve is fixedly attached to the top end of the left upright frame member, further wherein the right sleeve is fixedly attached to the top end of the right upright frame member;

a rectangular frame;

a pair of rods comprising a left rod and a right rod, wherein the left rod is fixedly attached to the rectangular frame and engages the left sleeve, wherein the right rod is fixedly attached to the rectangular frame and engages the right sleeve;

a pair of locking rods comprising a first locking rod and a second locking rod, wherein each of the locking rods is disposed on a portion of the rectangular frame that faces the left upright frame member;

a tabletop support bar, wherein the tabletop support bar is attached to both the left upright frame member and one locking rod of the pair of locking rods;

a tabletop surface retainable by the rectangular frame;

an electrical box attached to one of the right upright frame member and the left upright frame member;

a power cord hanger attached to the same one of the right upright frame member and the left upright frame member to which the electrical box is attached;

a power cord including a plug, wherein the power cord is configured to be hanged on the power cord hanger and is connectable to the electrical box;

wherein the tabletop support bar is configured to fix the tabletop surface and the rectangular frame into a fixed position upon rotation of the tabletop surface and the rectangular frame into a desired position;

wherein the plug on the power cord is operationally connectable to a source of standard electrical current;

wherein upon the operational connection of the power cord and the source of standard electrical current, a power tool is operationally connectable to the electrical box disposed on the right upright frame member.

2. A mobile work bench comprising:

a framework, the framework comprising a left bottom frame component;

a right bottom frame component;

a cross member frame component attached to each of the left bottom frame component and the right bottom frame component;

a plurality of caster wheels, a pair of caster wheels attached to each of the left bottom frame component and the right bottom frame component;

a left upright frame member having a top end, wherein the left upright frame member extends vertically from the left bottom frame component;

a pair of left frame support components comprising a first left frame support component and a second left frame support component, wherein each left frame support component is attached to both the left upright frame member and the left bottom frame component;

a right upright frame member, the right upright frame member having a top end, wherein the right upright frame member extends vertically from the right bottom frame component;

a pair of right frame support components comprising a first right frame support component and a second right frame support component, wherein each right frame support component is attached to both the right upright frame member and the right bottom frame component;

a pair of sleeves comprising a left sleeve and a right sleeve, wherein the left sleeve is fixedly attached to the top end of the left upright frame member, further wherein the right sleeve is fixedly attached to the top end of the right upright frame member;

a rectangular frame;

a pair of rods comprising a left rod and a right rod, wherein the left rod is fixedly attached to the rectangular frame and engages the left sleeve, wherein the right rod is fixedly attached to the rectangular frame and engages the right sleeve;

a pair of locking rods comprising a first locking rod and a second locking rod, wherein each of the locking rods is disposed on a portion of the rectangular frame that faces the left upright frame member;

a tabletop support bar, wherein the tabletop support bar is attached to both the left upright frame member and one locking rod of the pair of locking rods;

a tabletop surface retainable by the rectangular frame;

an electrical box attached to one of the right upright frame member and the left upright frame member;

a power cord hanger attached to the same one of the right upright frame member and the left upright frame member to which the electrical box is attached;

a power cord including a plug, wherein the power cord is configured to be hanged on the power cord hanger and is connectable to the electrical box;

wherein the tabletop support bar is configured to fix the tabletop surface and the rectangular frame into a fixed position upon rotation of the tabletop surface and the rectangular frame into a desired position;

wherein the plug on the power cord is operationally connectable to a source of standard electrical current;

wherein upon the operational connection of the power cord and the source of standard electrical current, a power tool is operationally connectable to the electrical box disposed on the right upright frame member.

3. A mobile work bench comprising according to claim 2 wherein the mobile work bench further comprises:

a pair of horizontal bar supports comprising a first horizontal bar support and a second horizontal bar support, wherein each horizontal bar support is attached to the rectangular frame;

wherein the tabletop surface releasably engages the rectangular frame atop each horizontal bar support.

4. A mobile work bench comprising according to claim 3 wherein the mobile work bench further comprises:

a plurality of fasteners, wherein each fastener engages both the tabletop surface and the respective one of the horizontal bar supports;

a plurality of nuts, wherein each nut engages one of the fasteners;

wherein the tabletop surface releasably engages the rectangular frame.

5. A mobile work bench comprising according to claim 4 wherein the mobile work bench further comprises:

a cotter pin engaging the tabletop support bar;

wherein the cotter pin engages one of the locking rods upon attachment of the locking rod to the tabletop support bar;

wherein the tabletop surface and the rectangular frame are lockable into a fixed position.

6. A mobile work bench comprising:

a framework, the framework comprising a left bottom frame component;

a right bottom frame component;

a cross member frame component, wherein the cross member frame component is attached to each of the left bottom frame component and the right bottom frame component;

a first pair of caster wheels comprising a first caster wheel and a second caster wheel, wherein each wheel of the first pair of caster wheels is attached to the left bottom frame component;

a second pair of caster wheels comprising a first caster wheel and a second caster wheel, wherein each wheel of the second pair of caster wheels is attached to the right bottom frame component;

a left upright frame member, the left upright frame member having a top end, wherein the left upright frame member extends vertically from the left bottom frame component;

a pair of left frame support components comprising a first left frame support component and a second left frame support component, wherein each left frame support component is attached to both the left upright frame member and the left bottom frame component;

a right upright frame member having a top end, wherein the right upright frame member extends vertically from the right bottom frame component;

a pair of right frame support components comprising a first right frame support component and a second right frame support component, wherein each right frame support component is attached to both the right upright frame member and the right bottom frame component;

a pair of sleeves comprising a left sleeve and a right sleeve, wherein the left sleeve is fixedly attached to the top end of the left upright frame member, further wherein the right sleeve is fixedly attached to the top end of the right upright frame member;

a rectangular frame;

a pair of rods comprising a left rod and a right rod, wherein the left rod is fixedly attached to the rectangular frame and engages the left sleeve, wherein the right rod is fixedly attached to the rectangular frame and engages the right sleeve;

a pair of locking rods comprising a first locking rod and a second locking rod, wherein each of the locking rods is disposed on a portion of the rectangular frame that faces the left upright frame member;

a tabletop support bar, wherein the tabletop support bar is attached to both the left upright frame member and one of the locking rods;

a tabletop surface releasably engaging the rectangular frame;

a pair of horizontal bar supports comprising a first horizontal bar support and a second horizontal bar support, wherein each horizontal bar support of the pair of horizontal bar support is attached to the rectangular frame, wherein the tabletop surface releasably engages the rectangular frame disposed atop the pair of horizontal bar supports;

an electrical box attached to one of the right upright frame member and the left upright frame member;

a power cord hanger attached to the same one of the right upright frame member and the left upright frame member to which the electrical box is attached;

a power cord including a plug, wherein the power cord is hangable on the power cord hanger, wherein the power cord is operationally connectable to the electrical box;

a plurality of fasteners, wherein each fastener engages both the tabletop surface and the respective one of the horizontal bar supports;

a plurality of nuts, wherein each nut engages a fastener;

a cotter pin, wherein the cotter pin engages one of the locking rods upon attachment of the locking rod to the tabletop support bar;

wherein the tabletop surface and the rectangular frame are lockable into a fixed position;

wherein the tabletop surface releasably engages the rectangular frame;

wherein the tabletop support bar is configured to lock the tabletop surface and the rectangular frame into a fixed position after the tabletop surface and the rectangular frame have been rotated to the desired position;

wherein the plug on the power cord is operationally connectable to a source of standard electrical current;

wherein upon the operational connection of the power cord and the source of standard electrical current, a power tool is operationally connectable to the electrical box disposed on the right upright frame member.

* * * * *